United States Patent Office 2,863,541
Patented Dec. 9, 1958

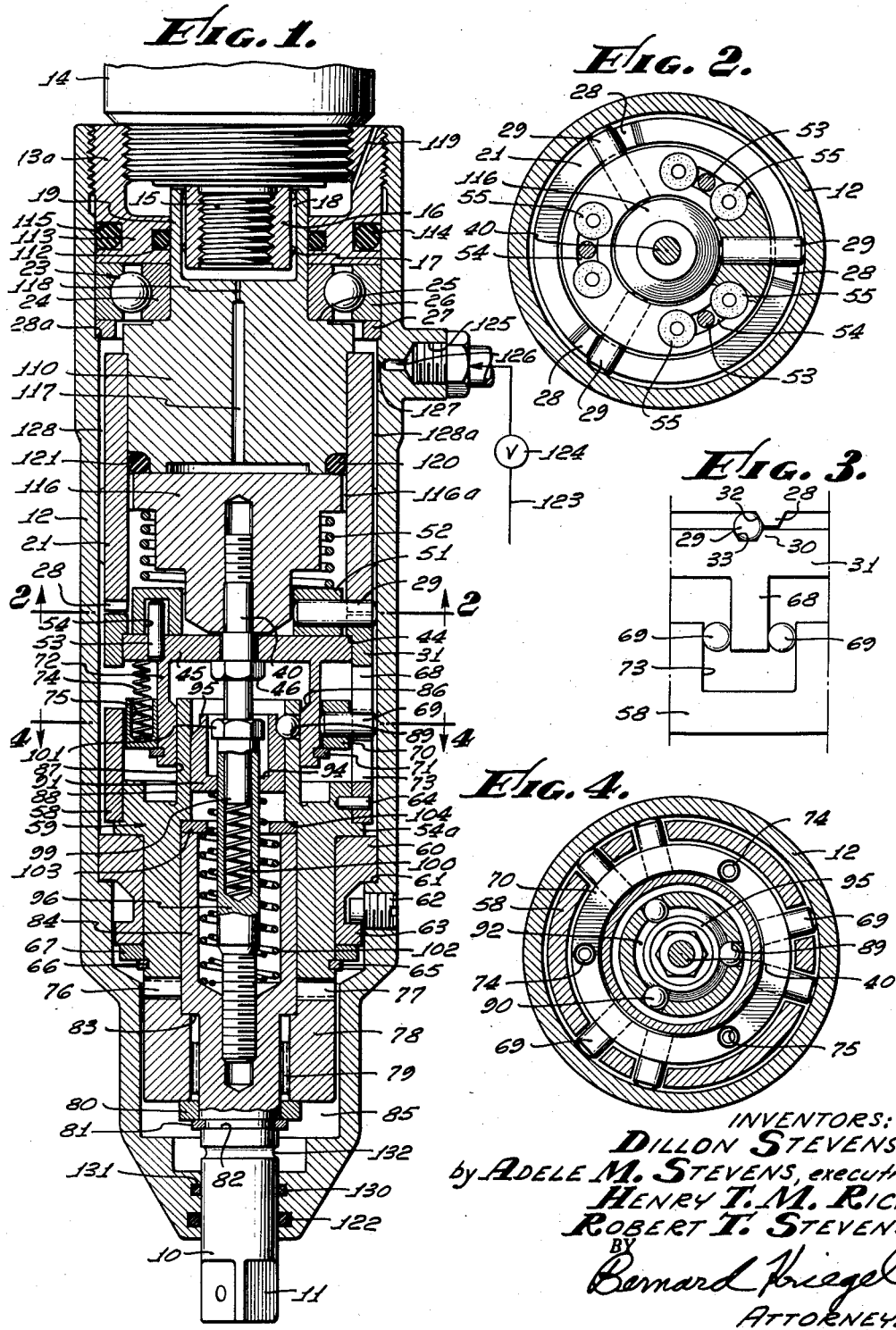

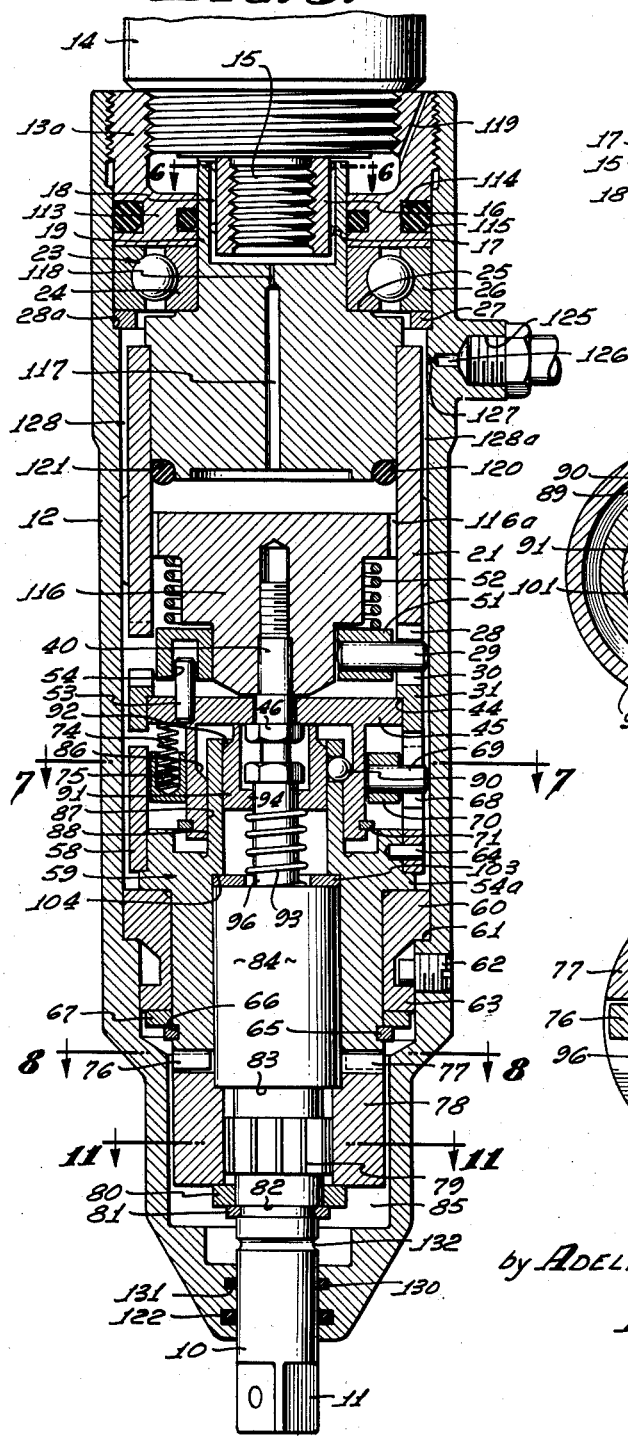

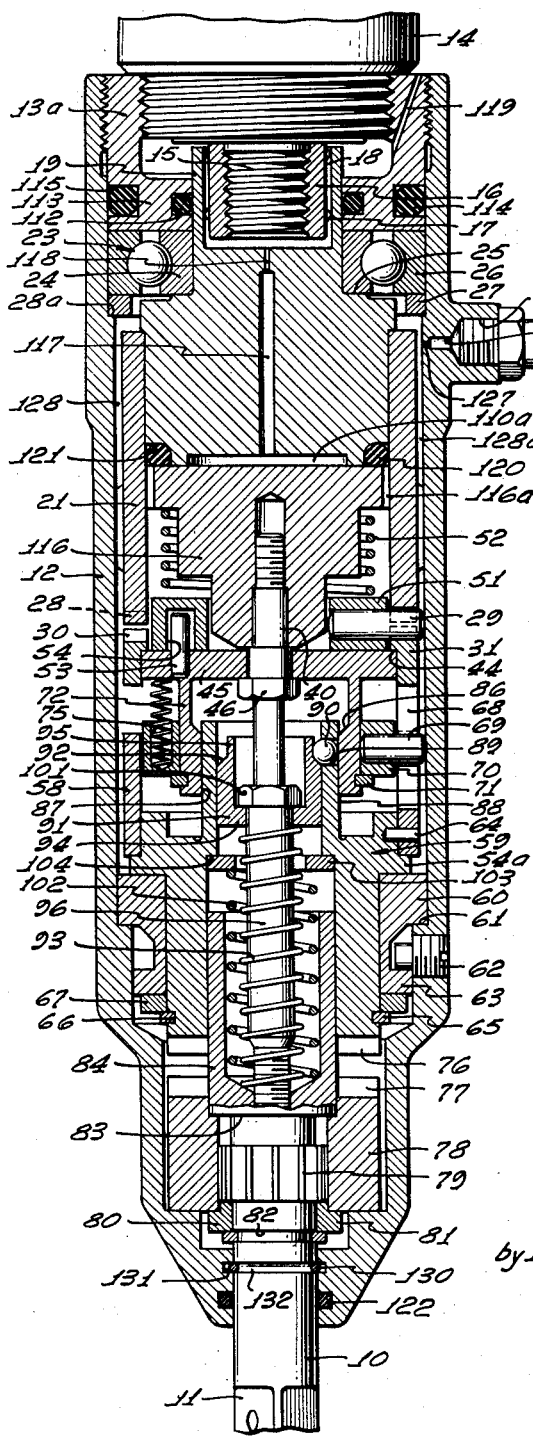
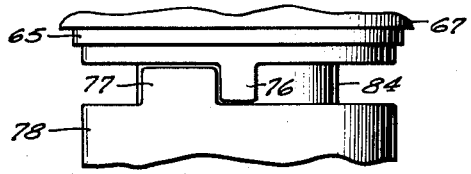
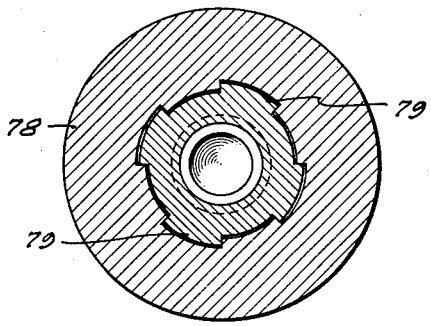
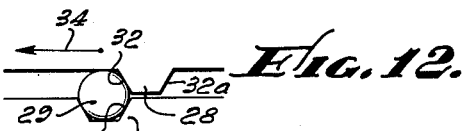
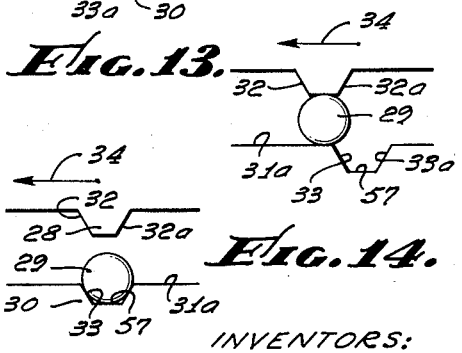
INVENTORS:
DILLON STEVENS
by ADELE M. STEVENS, executrix
HENRY T. M. RICE
ROBERT T. STEVENS
BY
Bernard Kriegel
ATTORNEY.

2,863,541

RELEASABLE TORQUE TRANSMITTING APPARATUS

Henry T. M. Rice, San Gabriel, Robert T. Stevens, Altadena, and Dillon Stevens, deceased, late of Los Angeles, Calif., by Adele M. Stevens, executrix, Los Angeles, Calif.

Original application October 16, 1950, Serial No. 190,344, now Patent No. 2,741,352, dated April 10, 1956. Divided and this application December 5, 1955, Serial No. 550,889

20 Claims. (Cl. 192—56)

The present invention relates to torque transmitting devices, and more particularly to devices which are automatically uncoupled or unclutched upon being subjected to a torque exceeding a predetermined maximum value.

This application is a division of the application of Dillon Stevens, Henry T. M. Rice and Robert T. Stevens, Serial No. 190,344, filed October 16, 1950, for "Releasable Torque Transmitting Apparatus" and now Patent No. 2,741,352, issued April 10, 1956.

Automatically releasable clutch devices are known for interrupting the drive between the driving and driven members when the torque being transmitted becomes excessive. Such devices, however, are not accurate or consistent in releasing the drive when the torque exceeds a desired predetermined value. This is particularly true in devices that place reliance upon springs or spring-like members to provide the force resisting disengagement of the clutch elements. Ordinarily, as the torque transmitted increases, the spring become more highly stressed, its resisting force increasing to an indefinite amount before the clutch elements disengage. The many variable factors surrounding the force exerted by the spring at the point of clutch release, as well as the greater amount of friction between the clutch elements themselves, make it exceedingly difficult and, as a practical matter, impossible to preset and predetermine the torque loads at which the clutch elements will release. As a result, such forms of automatically releasable clutches are grossly inaccurate. Moreover, since they release under maximum load conditions, the friction forces between the clutch teeth are very high, causing excessive and rapid wear of the parts and requiring their replacement in short order.

In addition to the high frictional engagement between the clutch parts at the point of release, the clutch elements remain released only momentarily, intermittently engaging and releasing from each other as power application to the mechanism continues. This imposes a repeated hammering action of the driving clutch elements upon the driven clutch elements, and subjects the parts and the ultimately driven member itself to torques that far exceed the amount at which the clutch releases intermittently. Power application must be discontinued to prevent continuation of the hammering or impact load on the parts.

Automatically releasable clutch devices are used in tools for rotating and tightening threaded fastening elements. The clutch is supposed to release when a predetermined maximum torque is imposed on the threaded fastening elements to insure against their being too loose or too tight. For the reasons mentioned above, among others, such release does not often occur at the required torque value. As a result, the tool is incapable of performing its intended function in an effective manner, leaving the fastening elements in an undesirable condition of looseness or excessive tightness, which may subject the elements and the parts to which they are fastened to inordinately high stresses and strains, possibly effecting distortion of such parts. The hammering action incident to intermittent release and reengagement of the clutch parts imposes particularly deleterious effects on the threaded fastening elements and the parts to which they are secured, which can only be minimized by stopping rotation of the prime mover so long as the tool remains applied to the threaded fastening elements. The need for stopping and restarting the prime mover, which is also required for shifting the tool from one threaded fastening element to another, reduces the production speed at which the parts can be assembled and necessarily increases production costs.

Accordingly, it is an object of the present invention to overcome the aforenoted difficulties and disadvantages inherent in the prior art releasable torque transmitting devices.

Another object of the invention is to provide torque transmitting apparatus which will automatically release with accuracy and consistency at the predetermined torque value at which the apparatus is designed or adjusted.

A further object of the invention is to reduce or minimize friction between the disengageable elements in the torque releasing device, in order to maintain accurately the torque at which the elements disengage or release from each other, for the purpose of interrupting the transmission of power. Whatever frictional resistance exists presents itself over only an exceedingly short interval of relative travel of the disengageable elements in a drive releasing direction.

Yet another object of the invention is to provide releasable torque transmitting apparatus in which the force holding the driving and driven elements in engagement is substantially instantaneously relieved or reduced to zero when a predetermined torque is exceeded, thereby facilitating release of the elements from each other and enabling such release to occur under substantially no-load conditions, all of which reduces wear on the relatively movable parts, increasing their useful life considerably and promoting accurate operation of the mechanism.

A further object of the invention is to provide torque transmitting apparatus which avoids use of springs and like instrumentalities furnishing the resisting force that predetermines the torque at which the drive through the apparatus will be released.

Yet another object of the invention is to provide releasable torque transmitting devices in which the resisting force holding the releasable driving elements in engagement remains substantially constant as the torque transmitted increases to the value at which the elements are to automatically discontinue transmission of the load or torque.

A further object of the invention is to provide releasable torque transmitting apparatus in which the torque at which the drive through the apparatus will release is readily adjustable. Such adjustment can take place over a broad range of torque releasing values.

Yet a further object of the invention is to provide releasable torque transmitting apparatus which is capable of infinite and accurate adjustment between limits to predetermine the torque at which the drive through the apparatus will be released.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through an apparatus embodying the invention, with the primary and secondary clutch engaged;

Fig. 2 is a cross-section taken along the line 2—2 on Fig. 1;

Fig. 3 is a diagrammatic view of a portion of the primary clutch and spline connection;

Fig. 4 is a cross-section taken along the line 4—4 on Fig. 1;

Fig. 5 is a view similar to Fig 1, disclosing the primary clutch latched in disengaged position;

Fig. 6 is a cross-section taken along the line 6—6 on Fig. 5;

Fig. 7 is an enlarged cross-section taken along the line 7—7 on Fig. 5;

Fig. 8 is an enlarged cross-section taken along the line 8—8 on Fig. 5;

Fig. 9 is a view similar to Fig. 1, disclosing the primary clutch engaged and the secondary clutch disengaged;

Fig. 10 is an enlarged fragmentary side elevation of the secondary clutch;

Fig. 11 is an enlarged cross-section taken along the line 11—11 on Fig. 5;

Fig. 12 is a diagrammatic view of the primary clutch in engaged position;

Fig. 13 is a view similar to Fig. 12, disclosing the primary clutch in partially disengaged position;

Fig. 14 is a view similar to Fig. 12, disclosing the primary clutch in fully disengaged position.

The apparatus illustrated in the drawings is particularly designed to rotate a spindle 10 having a suitable non-circular end 11 for application to threaded fastening elements (not shown) for the purpose of tightening such elements to a predetermined extent, after which the drive through the spindle is automatically discontinued. It is to be understood, however, that the apparatus is of more general application, in that it may be used as an overload release device discontinuing the drive or application of turning effort to other parts when the torque transmitted exceeds a predetermined maximum value.

As disclosed in the drawings, the apparatus is contained within a suitable elongate casing 12 having an adapter ring 13a threaded into its upper end, by means of which the casing is firmly secured to the housing 14 of a prime mover, which may take the form of an electric or air operated motor. The motor shaft 15 extends into the casing, being threadedly secured within a sleeve 16 having external splines 17 engaging internal splines 18 formed in an upwardly extending sleeve-like portion 19 of a valve body 110. This body is rigidly secured to a driving sleeve or clutch member 21, as by providing a shrink fit between the two parts.

The valve body 110 is rotatably supported within the casing 12 through a suitable anti-friction radial and thrust bearing 23, which encompasses the housing extension 19 and whose inner race 24 engages the upper shoulder 25 of the body. The outer race 26 of the bearing is clamped between the upper adapter ring 13a and a lower ring 27 bearing upon a casing shoulder 28a.

The driving clutch member 21 may make a close sliding fit with the inner wall of the casing 12, to provide a supplementary bearing support. This member has a plurality of circumferentially spaced driving clutch teeth 28 engageable with anti-friction rollable elements 29 in the form of rollers which are, in turn, engageable with driven clutch teeth 30 formed upon a driven clutch member 31. The driving teeth 28 may be formed as axial or face cams having tapered faces 32 engaging the rollers 29, and these latter elements may, in turn, engage companion tapered cam faces 33 on the driven teeth 30. From an inspection of Figs. 12 to 14, it is apparent that rotation of the driving clutch member 21 in the direction of the arrow 34 will cause corresponding rotation of the driven clutch member 31, but, in so doing, there will be a component of force tending to shift the driven clutch member 31 longitudinally and away from the driving clutch member, for the purpose of effecting disconnection between the clutch parts 28, 29, 30. Such tendency for the clutch parts to separate and become disconnected is resisted by a holding device that urges the driven clutch member 31 and the anti-friction roller 29 toward the driving member and maintains the parts in coupling relation. This holding device exerts a predetermined holding force upon the parts, which force remains constant regardless of any variation or increases of the torque being transmitted through the clutch. When the torque transmitted overcomes the holding force, the latter is substantially reduced to zero, enabling full release between the clutch parts to take place under substantially no-load conditions.

The holding device which provides the force maintaining the primary clutch elements in driving engagement is supplied by a fluid actuated mechanism of which the aforementioned valve body 110 forms a part. Fluid leakage around the exterior of the extension 19 of this body is prevented by a suitable side seal 112 in a flange portion 113 of the adapter ring 13a that is threadedly connected to both the casing 12 and the prime mover housing 14. Leakage between the casing and adapter is also prevented by a suitable side seal 114 contained in a groove 115 in the adapter 13a and engaging the inner wall of the casing.

The fluid actuated clutch holding mechanism further includes a valve head plunger or piston 116 adapted to engage the lower end of the valve body 110 and prevent passage of fluid under pressure from within the casing 12 out through a fluid exhaust passage 117 extending through the valve body. A suitable orifice 118 may be provided in this passage to retard the escape of fluid from the casing 12 upon retraction of the valve head 116 from the valve body 110. Such fluid, when allowed to flow through the passage 117 and orifice 118, will pass to the exterior of the casing 12 through the space provided between the threaded sleeve 16 and body extension 19, and through a fluid outlet or vent 119 extending through the adapter ring 13a.

When the head 116 is engaged with the valve body 110, leakage is prevented by a suitable gasket 120, which may be in the form of a rubber or rubber-like O ring, in a peripheral groove 121 in the lower portion of the valve body 110. When engaged by the valve head 116, the gasket is compressed into firm sealing engagement with the latter, to prevent fluid leakage into the passage 117. Leakage from the casing 12 in a downward direction is prevented by a shaft seal 122 engaging the spindle 10.

Fluid under pressure from a suitable source can flow through a line 123 and a pressure regulator valve 124 into a fluid inlet 125 secured to the casing 12. This inlet communicates with a port 126 in the casing having a metering orifice 127 therein to restrict the rate at which the fluid can flow into the casing 12. Such fluid will pass downwardly through longitudinal grooves 128a and the clearance space 128 around the driving clutch member 21 for action upon the underside of the valve head 116, urging and holding it in an upward direction in a position closing the exhaust passage 117, which is open to the atmosphere. The unit fluid pressure in the casing 12 determines the total force holding the valve head 116 in an upward position, securing the primary clutch elements 28, 29, 30 in driving engagement with each other, as described hereinbelow. This force remains constant during the rotation of the various parts and as the torque transmitted increases.

The valve member 116 is pulled away from the valve body 110 to release the holding force as a result of the downward component of force proportional to the torque being transmitted through the primary clutch device. Thus, the driven clutch member 31 has a downwardly facing shoulder 44 engaging a valve head retracting member 45, the latter part rotating with the driven clutch member by virtue of the shrink fit between the parts.

The downward force on the retracting member is transmitted to the valve head 116 by engagement of the former with the head 46 formed on a central screw or rod 40, which is threadedly attached to the valve head 116. The downward force of the retracting member 45 on the rod 40 pulls the head 116 away from the body 110, to open the exhaust passage 117.

The anti-friction radially mounted rollers 29 are rotatable within a cage or carrier 51 encompassing the valve body 116. This carrier is urged in a downward direction by a helical return spring 52 compressed between the outer flange portion of the head 116 and the carrier 51. The carrier itself is rotatable with the driven clutch member 31 and the retracting member 45, but is movable angularly to a limited extent with respect to the parts, to enable disengagement of the clutch to take place, and also to insure that the rollers 29 will remain out of engagement with the driving clutch teeth when the clutch is disengaged. Thus, the retracting member 45 has a plurality of pins 53 secured to it which extend upwardly into arcuate channels 54 formed in the roller carrier 51. At the opposite ends of each channel, the carrier is provided with elastic members 55 in the form of rubber cylindrical positioning members that are engaged by each pin 53 and which will yield or deform to allow relative rotation between the retracting member 45 and cage 51 to a limited extent for both directions of rotation of the latter and of the driven clutch member 31 attached thereto, for a purpose described below.

Assuming that the valve head 116 engages the body 110 and seal ring 120, the air pressure acting on the rod imposes an upward holding force upon the rod 40, retracting member 45, and the driven clutch member 31, holding the latter in an upward position with the rollers 29 effecting a driving connection between the driving cam teeth 28 and the driven cam teeth 30 (see Figs. 1 and 9). The rotation of the prime mover 14 is transmitted through its shaft 15 and the valve body 110 to the driving clutch member 21, and through the teeth 28 of the latter to the anti-friction rollers 29, which bear against the cam faces 33 of the driven clutch member 31. Because of the inclination of the driving and driven cam teeth 32, 33, the torque being transmitted tends to shift the anti-friction rollers 29 and the driven clutch member 31 away from the driving clutch member 21, but such separating movement is resisted and prevented by the holding action of the air pressure upon the valve head 116. This is evident, since the downward thrust of the driven clutch member 31 is transmitted through the retracting member 45 and rod 40, the latter being attached to the head 116 itself.

When the torque exceeds a predetermined value corresponding to the holding force of the fluid on the valve head 116, the latter is shifted downwardly by the primary clutch elements 28, 29, 30, retracting member 45, and attaching rod or screw 40, the head pulling away from the gasket 120 and opening the exhaust passage 117. Immediately upon such opening, the fluid on the high pressure side of the head 116 can flow around the periphery of the valve head, or through side grooves 116a provided therein to the other side of the valve head, thereby equalizing the pressure on each side and reducing the holding force to near zero, the fluid escaping through the fluid passage 117, orifice 118 and fluid outlet 119 to the exterior of the casing 12. The equalizing and escape of the pressure occurs very rapidly, releasing the holding force on the primary clutch parts and allowing them to be shifted downwardly substantially instantaneously to fully released position. Such shifting action will occur since the inclined driving cam teeth 28 shift the rollers 29 in a downward direction and cause the driven clutch member 31 also to shift in a downward direction, the rollers 29 riding relatively upward on the driven cam faces 33 to the top 1 and 31a on the driven clutch member, and the driving clutch teeth 28 riding completely upward (relatively) upon the rollers 29, in the manner represented diagramatically in Fig. 13. The relative angular movement between the rollers 29 and the driven clutch member 31 is permitted by the yieldable rubber cushion and pin connections 55, 53 provided between the roller carrier 51 and the retracting member 45.

As soon as the driving clutch teeth 28 ride upon and over the rollers 29, the force that has shifted the carrier 51 angularly with respect to the retracting member 45 is released, allowing the rubber cushioning members 55 to bear upon the pin 53 and return the carrier to its initial position relative to the retracting member and driven clutch member 31, with the rollers 29 back into alignment with the driven cam faces 33, whereupon the return spring 52 is effective to shift the cages 51 downwardly, and locate the rollers 29 in their downward position within the driven clutch member 31, such as illustrated diagrammatically in Fig. 14. The action just described occurs rapidly and before the next succeeding driving clutch tooth 28 can reach the roller, thereby preventing any driving engagement between the succeeding driving clutch teeth 28 and the anti-friction rollers 29.

Each driving clutch tooth 28 may be formed with oppositely inclined cam faces 32, 32a, and the driven member 31 may be formed with companion oppositely directed cam faces 33, 33a, in effect, forming grooves or pockets 57 in which the rollers 29 are received. This arrangement will adapt the clutch for operation in both directions of rotation and render the apparatus more flexible in its use. The same action, however, will occur when the parts are rotated in a reverse direction, since the cage 51 will move angularly during disconnection of the parts to cause the opposite rubber block 55 to engage the pins 53 when the roller carrier is shifted angularly relative to the retracting member 45 in the opposite direction. Release of the drive will allow such opposite blocks to engage the pins and return the cage 51 to its initial position, in which the rollers 29 are again relocated within the pockets 57 of the driven clutch member.

The rotation of the driven clutch member 31 is transmitted to a driven spline member 58 that makes a shrink fit with a secondary clutch driving member 59 rotatable within a sleeve bearing 60 secured in position within the casing 12 by being held upon a shoulder 61 in the casing by screws 62 threaded into the casing and engaging a lower bearing flange 63. If desired, a pin connection 64 may also be provided between the driven spline member 58 and the secondary clutch driving member 59. The secondary clutch driving member 59 has a flange 54a resting upon the upper end of the sleeve bearing 60, and is prevented from axial movement by a split snap retainer ring 65 secured within a groove 66 in the driving member and engaging a thrust washer 67 bearing against the lower end of the sleeve bearing.

Since the secondary clutch driving member 59 cannot partake of axial movement, and since the driven member 31 of the primary clutch moves axially during its shifting between clutching and unclutching positions with respect to the driving clutch member, a spline connection is provided between the driven clutch member 31 and the driven spline member 58 secured to the secondary clutch driving member 59. In order to minimize sliding friction between the driven clutch member and the driven spline member, the former is provided with depending circumferentially spaced splines 68, each of which fits between radial roller elements 69 that are rotatable within a suitable carrier 70 supported upon a split snap ring 71 secured to a depending skirt portion 72 of the retracting member 45. The roller 69 on one side of each spline 68 is engageable with a spline face 73 on the driven spline member 58, whereas the roller 69 on the opposite side of the driven clutch spline 68 is engageable with an opposing spline face 73 on the driven spline member 58, thereby adapting the spline connection for operation of the apparatus in both rotary directions.

It is apparent that the rotation imparted to the driven clutch member 31 is transmitted through the splines 68 and anti-friction rollers 69 to the driven spline member 58, and from the latter to the secondary clutch driving member 59. During downward shifting of the driven clutch member 31, such rotatable engagement is maintained, the rollers 69 merely riding downwardly along the spline walls 73 of the driven spline member and carrying their supporting cage 70 downwardly with them. Such downward movement of the cage is permitted since the snap retainer ring 71 moves downwardly with the retracting member 45 and driven clutch member 31 to a greater distance (actually twice the distance) than the roller cage 71 is moved in a downward direction, as a result of rolling of the anti-friction roller 69 along the wall 73 of the spline member 58. Normally, the cage 70 is maintained in engagement with the supporting snap ring 71 by a plurality of circumferentially spaced helical compression springs 74 bearing upon the retracted member 75 and the cage itself, these springs being retained in proper position by being received within pockets 75 formed in the cage.

The rotation of the secondary clutch driving member 59 is transmitted through its axially extending clutch teeth or dogs 76 to the clutch teeth or dogs 77 on a secondary clutch driven member 78, which makes a spline connection 79 with the spindle 10 extending axially and outwardly through the lower end of the casing 12. The driven member 78 is secured to the spindle 10 by resting upon a lower washer 80, which, in turn, engages a split snap retainer ring 81 received within a spindle groove 82. The upper portion of the secondary clutch driven member 78 engages a shoulder 83 provided by a hollow spindle head 84 rotatable within the secondary clutch driving member 59. Suitable clearance 85 is provided between the lower end of the driven member 78 and the lower end of the casing 12, to allow the spindle 10 and driven member to move in a downward direction and disengage the driven clutch dogs 77 from the driving clutch dogs 76, in order that no rotation is imparted to the spindle regardless of the connection or disconnection of the primary clutch elements 28, 29, 30 with respect to one another.

Once the primary clutch members 28, 29, 20 have been disconnected, following the pulling away of the valve head 116 from the valve body 110 and seal ring 120, it is desired to hold such parts in their disengaged position until purposely allowed to reengage by the operator. Such holding action is effected by securing the retracting member 45, driven clutch member 31, and valve head 116 in a downward direction. To accomplish this purpose, the depending sleeve portion 72 of the retracting member is provided with an internal latch shoulder 86 inclined in a downward and inward direction. The inner end of this shoulder terminates at the inner cylindrical wall 87 of the depending sleeve 72, which is slidable along an upwardly extending cylindrical portion 88 of the secondary clutch driving member 59. This cylindrical portion is provided with a plurality of radial holes 89 receiving latch balls 90 which may either extend inwardly of the cylindrical portion 88, in which event the latch balls are ineffective to hold the retracting member 45 in a downward position, or in an outward direction in engagement with the latch shoulder 86, in which the balls are effective to hold the retracting member 45 and driven clutch member 31 in a released position.

Disposed within the latch cylinder 88 is a latch cam and retainer sleeve 91 that is slidable along and within the former. This retainer has a tapered peripheral cam shoulder 92 inclined in a downward and outward direction, and engageable with the balls 90. A helical actuating spring 93 is disposed within the spindle head 84, its lower end engaging the spindle and its upper end an inwardly directed flange 94 on the latch sleeve 91, to urge the latch sleeve in an upward direction and cause the cam shoulder 92 to urge the latch balls 90 in an outward direction. Inward movement of the balls is limited by engagement with the reduced diameter upper end 95 of the latch sleeve.

When the torque transmitted exceeds a predetermined maximum value, the retracting member 45 is shifted in a downward direction with the driven clutch member 31. When the latch shoulder 86 on the retracting member reaches a position in alignment with the latch balls 90, the latter are urged outwardly by the cam shoulder 92 of the spring actuated latch sleeve 91 to a position on top of the latch shoulder 86, the latch sleeve 91 then sliding past the balls and across the cylinder apertures 89, to present the cylindrical periphery of the sleeve 91 against the balls, preventing the inclined latch shoulder 86 from shifting the balls inwardly out of their latching position. Upward movement of the latch sleeve to the position just referred to is limited by engagement of its upper end with the retracting member 45, as shown in Fig. 5.

The primary clutch will remain in disconnected position, the rollers 29 and driven clutch member 31 being latched out of operative position with respect to the driving clutch member 21, so long as the latch sleeve 91 is disposed in its upward position. This latch sleeve is shifted downwardly to its initial ball releasing position upon downward movement of the spindle 10 within the housing 12.

To effect the aforementioned releasing movement of the latch sleeve 91, a latch releasing member 96 extends through the hollow spindle head 84 and is threaded into the spindle 10. The releasing member 96 is preferably made hollow, to slidably receive a depending stem 99 of the central screw 40, which is freely piloted within the releasing member. A helical compression spring 100 is disposed in the latter part, bearing upon the lower shoulder of its bore and upon the stem 99, so as to reengage the valve head 116 with the valve body 110 and seal ring 120. The releasing member 96 is provided with an upper head 101 adapted to engage the inturned shoulder 94 of the latch sleeve 91 and effect release of the latter.

The spindle 10 is urged axially in an outward direction to disengage the secondary clutch driven member 78 and the driving member 59 and to shift the latch releasing member 96 downwardly by a helical compression spring 102 disposed within the hollow spindle head 84, the lower end of the spring bearing upon the spindle, and its upper end upon a spring seat 103 resting against a shoulder 104 formed in the secondary clutch driving member 59. Assuming that the latch sleeve 91 is in the upward position, to hold the latch balls 90 upon the latch shoulder 86, for the purpose of maintaining the primary clutch in disengaged position, and that an inwardly directed axial force is imposed upon the spindle 10, the releasing head 101 on the releasing member will be disposed above the latch sleeve shoulder 94, as shown in Fig. 5. However, upon releasing the endwise inwardly directed force on the spindle 10, its return spring 102 will expand, to shift the spindle downwardly and disengage the driven member clutch dogs 77 and the driving member clutch dogs 76. The spindle may be maintained in such clutch disengaged position by a suitable detent device, such as a split contractile ring 130 disposed in a casing groove 131 and releasably receivable in a spindle groove 132. Downward movement also engages the releasing head 101 with the latch sleeve shoulder 94, returning the latch sleeve 91 downwardly to its initial position, at which its cam shoulder 94 is disposed below the balls 90. The spring 100 is then effective to shift the valve head 116 upwardly, carrying the retracting member 45 with it and causing the latch shoulder 86 to relocate the balls 90 in their inward ineffective position, in which they are retained by the inner cylindrical wall 87 of the retracting member skirt 72 (see Fig. 9).

Despite the fact that the primary clutch has been reengaged and all of the clutch parts placed in rotation, the spindle can still remain free of rotation inasmuch as the secondary clutch driven member 78 has been disengaged from the secondary clutch driving member 59 (Fig. 9), being held in disengaged position by the detent member 130. It is only when the spindle 10 is again shifted upwardly to release the detent from the spindle groove 132 that the clutch dogs 76, 77 can reengage and the drive to the spindle be reestablished.

The specific tool disclosed in the drawings has been designed particularly for use in rotating and tightening threaded fastening elements. Initially, the parts occupy the position disclosed in Fig. 9, in which the valve head 116 engages the valve body 110, the air under pressure acting upwardly on the valve head 116 to hold the primary clutch elements 28, 29, 30 in operative driving position with respect to each other. The spindle 10 and the secondary clutch driven member 78, however, are stationary, despite the energization of the prime mover 14 and rotation of the other parts of the mechanism. When the spindle 10 is placed in driving relation with a threaded fastening element (not shown), an axial force is then imposed on the apparatus to shift the spindle inwardly and place the secondary clutch driven dogs 77 in engagement with the driving clutch dogs 76, whereupon the apparatus is effective to rotate the spindle 10 and the threaded fastening element attached thereto (Fig. 1).

As the threaded fastening element becomes tightened, the torque transmitted through the apparatus, and particularly the primary clutch, increases, there being a tendency for the torque to shift the rollers 29 upwardly along the driven cam faces 33 and the driven clutch member 31 in a downward direction against the resisting force offered by the air pressure acting upon the valve head 116. When the torque exceeds a predetermined value, corresponding to the holding force of the air pressure or other fluid on the valve head 116, the latter is shifted downwardly by the primary clutch elements 28, 29, 30, retracting member 45, and retracting screw 40, the head pulling away from the gasket 120 and opening the exhaust passage 117. Immediately upon such opening, the fluid on the high pressure side of the head 116 will flow around the periphery of the valve head, or through the side groove 116a provided therein, to the other side of the valve head, equalizing the pressure on each side and reducing the holding force to substantially zero, the fluid escaping through the fluid passage 117, orifice 118 and fluid outlet 119 to the exterior of the casing 12. The equalizing and escape of the pressure occurs very rapidly, releasing the holding force of the primary clutch parts, and allowing them to be shifted downwardly substantially instantaneously to fully released position, in which relation they are held by the latch device 72, 90, 91, the latch sleeve 91 forcing the balls 90 outwardly behind the shoulder 86 of the retracting member 45. The balls are prevented from moving out of this latched position by the cylindrical periphery of the latch sleeve 91 (Fig. 5).

The parts remain in such unclutched position, in which no driving effort is imparted to the spindle 10 until the tool is removed from the threaded fastening element, whereupon the spring 102 is effective to shift the spindle 10 downwardly, disengaging the driven clutch dogs 77 from the driving clutch dogs 76, and shifting the releasing head 101 against the latch sleeve shoulder 94. This action moves the latch sleeve 91 downwardly along the balls 90, to be reshifted inwardly by the latch shoulder 86 upon upward movement of the retracting member 45 under the influence of the valve closing spring 100, which again places the primary clutch parts in driving position (Fig. 9). With the motor running, the drive takes place again through the primary clutch device and the spline connection 68, 69, 58 to the secondary clutch driving member 59. However, the spindle 10 is not being rotated at this time, and will not be rotated until it is shifted inwardly against the force of the return spring 102 upon being applied to another threaded fastening element.

In view of the fact that the primary clutch releases upon being subjected to a predetermined torque and is latched in such released position, continued rotation of the prime mover 14 can have no effect in applying turning effort to the spindle 10. Similarly, since the latch is not released to permit reengagement of the primary clutch until after the spindle has disengaged the secondary clutch 76, 77, continued rotation of the prime mover can still have no effect in rotating the spindle. As a result, the prime mover may continue its rotation without interruption. Turning effort applied to the spindle 10 ceases immediately upon imposing a predetermined torque on the threaded fastening element, and such turning effort is not reimposed until after the spindle 10 has been applied to another threaded fastening element and the secondary clutch engaged.

The fluid under pressure, which may be compressed air, can flow into the casing 12 only at a retarded rate because of the inlet metering orifice 127, so that there is very little loss of air from the casing when the valve head 116 is forced away from the valve body 110, to open the exhaust passage 117. Upon downward shifting of the valve head, the air pressure on both sides thereof becomes substantially equalized instantaneously, since the outlet orifice 118 prevents rapid escape of air from the mechanism and causes a rapid build-up of pressure on the outlet or low pressure side of the valve head 116. To prevent the formation of excessive and variable vacuums over extended and indefinite areas between the face of the valve head 116 and the valve body 110, which might arise under conditions of very rapid opening if there were metal-to-metal contact between these faces and which might adversely affect the accuracy of the clutch release point, the lower end of the valve body 110 may be provided with a shallow chamber 110a extending across its face. The chamber 110a is preferably made comparatively shallow to provide a small volume to be filled by the high pressure air as it flows around the valve head 116, thereby insuring that substantially instantaneous equalizing of the air pressure on both sides of the head takes place once the valve head is pulled away from the body 110, upon transmission of a torque which just exceeds the predetermined value corresponding to the air pressure tending to hold the valve head closed against the gasket on the body.

The fluid control device illustrated in the drawings is very easily adjusted to vary the force holding the valve head 116 in closed position against the valve body 110 simply by varying the air pressure entering the casing 12. This adjustment is made simply by suitable manipulation or adjustment of the pressure regulator 124.

In the apparatus, a constant force is provided to hold the primary clutch parts in driving engagement, despite variations or increase in the torque being transmitted to the apparatus. When the torque exceeds a predetermined maximum, the holding force on the clutch parts is immediately overcome, and rapidly reduced to substantially zero, causing declutching to occur over substantially the entire range of relative longitudinal movement between the clutch parts under substantially no-load conditions. The parts are positively held out of clutching relation to preclude hammering action as the prime mover continues rotation, the latch 91, 90 being released only upon removal of the spindle 10 from the threaded fastening element, or other work, whereupon the primary clutch is automatically reengaged without any rotation being imparted to the spindle. The spindle may then be applied to other work, or the same work, which causes the secondary clutch 76, 77 to engage and torque again transmitted to the spindle.

The inventors claim:

1. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means for holding said clutch elements in driving engagement with each other; means for relieving the fluid pressure differential acting on said fluid pressure operated means upon initial slight axial separating movement between said elements in response to the torque transmitted through said elements exceeding a predetermined value; releasable latch means including a mechanical holding member that engages one of said members to maintain said clutch elements disengaged; and means for engaging said clutch elements upon release of said latch means.

2. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means for holding said clutch elements in driving engagement with each other, said fluid pressure operated means having a high pressure side and a low pressure side; means for feeding fluid under pressure against said high pressure side to hold said elements in driving engagement with each other; means for preventing said fluid under pressure from acting on said low pressure side; and means for simultaneously substantially equalizing the pressures on said high and low pressure sides of said fluid pressure operated means upon initial slight axial separating movement between said elements in response to the torque transmitted through said elements exceeding a predetermined value.

3. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means for holding said clutch elements in driving engagement with each other, said fluid pressure operated means having a high pressure side and a low pressure side; means for feeding fluid under pressure against said high pressure side to hold said elements in driving engagement with each other; means for preventing said fluid under pressure from acting on said low pressure side; and means for simultaneously substantially equalizing the pressures on said high and low pressure sides of said fluid pressure operated means in response to the torque transmitted through said elements exceeding a predetermined value.

4. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means for holding said clutch elements in driving engagement with each other, said fluid pressure operated means having a high pressure side and a low pressure side; means for feeding fluid under pressure against said high pressure side to hold said elements in driving engagement with each other; means providing communication between said low pressure side and the surrounding atmosphere while fluid under pressure acts upon said high pressure side; and means for simultaneously substantially equalizing the pressure on said high and low pressure sides of said fluid pressure operated means in response to the torque transmitted through said elements exceeding a predetermined value.

5. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means movable axially with one of said members and acted on by fluid pressure differential to hold said clutch elements in driving engagement with each other; and means for reducing said fluid pressure differential to substantially zero upon initial slight axial movement of said fluid pressure operated means and said one of said members in response to the torque transmitted through said elements exceeding a predetermined value.

6. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means movable axially with one of said members, said fluid pressure operated means having a high pressure side and a low pressure side; means for feeding fluid under pressure against said high pressure side to hold said elements in driving engagement with each other; means operatively associated with said fluid pressure operated means initially preventing said fluid under pressure from acting on said low pressure side; initial slight axial movement of said fluid pressure operated means and said one of said members in response to the torque transmitted through said elements exceeding a predetermined value shifting said preventing means to a position allowing said fluid under pressure to act simultaneously on both said high pressure and low pressure sides to reduce the force holding said elements engaged to substantially zero.

7. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means movable axially with one of said members, said fluid pressure operated means having a high pressure side and a low pressure side; means for feeding fluid under pressure against said high pressure side to hold said elements in driving engagement with each other; means operatively associated with said fluid pressure operated means initially preventing said fluid under pressure from acting on said low pressure side and for placing said low pressure side in communication with the surrounding atmosphere; axial movement of said fluid pressure operated means and said one of said members in response to the torque transmitted through said elements exceeding a predetermined value shifting said preventing means to a position allowing said fluid under pressure to act simultaneously on both said high pressure and low pressure sides and establishing communication between said fluid feeding means and the surrounding atmosphere.

8. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure operated means movable axially with one of said members, said fluid pressure operated means having a high pressure side and a low pressure side; means for feeding fluid under pressure against said high pressure side to hold said elements in driving engagement with each other; means initially preventing said fluid under pressure from acting on said low pressure side; axial movement of said fluid pressure operated means and said one of said members in response to the torque transmitted through said elements exceeding a predetermined value shifting said preventing means to a position allowing said fluid under pressure to act simultaneously on both said high pressure and low pressure sides to reduce the force holding said elements engaged to substantially zero.

9. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with one of said members and acted on by fluid pressure differential to hold said fluid pressure actuated means engaged with the other of said members and said clutch elements in driving engagement with each other; and means responsive to initial slight axial separation between said elements, which shifts said fluid pressure operated means from engagement with said other of said members in response to the torque transmitted through said elements exceeding a predetermined value, to reduce said fluid pressure differential to substantially zero.

10. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with one of said members, said fluid pressure actuated means having a high pressure side and a low pressure side; means for feeding fluid under pressure against said high pressure side to hold said fluid pressure actuated means engaged with the other of said members and said elements in driving engagement with each other; coengaging means on said fluid pressure actuated means and said other of said members initially preventing said fluid under pressure from acting on said low pressure side; axial movement of said fluid pressure actuated means and said one of said members away from said other of said members in response to the torque transmitted through said elements exceeding a predetermined value allowing said fluid under pressure to act simultaneously on both said high pressure and low pressure sides to reduce the force holding said elements engaged to substantially zero.

11. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with one of said members, said fluid pressure actuated means having a high pressure side and a low pressure side; means for feeding fluid under pressure against said high pressure side to hold said fluid pressure actuated means engaged with the other of said members and said elements in driving engagement with each other; said other of said members having a passage establishing communication between said low pressure side and the surrounding atmosphere; coengaging means on said fluid pressure actuated means and said other of said members initially closing said passage and preventing said fluid under pressure from acting on said low pressure side; axial movement of said fluid pressure actuated means and said one of said members away from said other of said members in response to the torque transmitted through said elements exceeding a predetermined value opening said passage and placing said fluid pressure actuated means in position for said fluid under pressure to act simultaneously on both said high pressure and low pressure sides.

12. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with said driven member and acted on by fluid pressure differential to hold said fluid pressure actuated means engaged with said driving member and said clutch elements in driving engagement with each other; and means responsive to initial slight axial separation between said elements, which shifts said fluid pressure actuated means from engagement with said driving member in response to the torque transmitted through said elements exceeding a predetermined value, to reduce said fluid pressure differential to substantially zero.

13. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with said driven member, said fluid pressure actuated means having a high pressure side and a low pressure side; means for feeding fluid under pressure against said high pressure side to hold said fluid pressure actuated means engaged with said driving member and said elements in driving engagement with each other; coengaging means on said fluid pressure actuated means and said driving member initially preventing said fluid under pressure from acting on said low pressure side; axial movement of said fluid pressure actuated means and said driven member away from said driving member in response to the torque transmitted through said elements exceeding a predetermined value allowing said fluid under pressure to act simultaneously on both said high pressure and low pressure sides to reduce the force holding said elements engaged to substantially zero.

14. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with said driven member, said fluid pressure actuated means having a high pressure side and a low pressure side; means for feeding fluid under pressure against said high pressure side to hold said fluid pressure actuated means engaged with said driving member and said elements in driving engagement with each other; said driving member having a passage establishing communication between said low pressure side and the surrounding atmosphere; coengaging means on said fluid pressure actuated means and said driving member initially closing said passage and preventing said fluid under pressure from acting on said low pressure side; axial movement of said fluid pressure actuated means and said driven member away from said driving member in response to the torque transmitted through said elements exceeding a predetermined value opening said passage and placing said fluid pressure actuated means in position for said fluid under pressure to act simultaneously on both said high pressure and low pressure sides.

15. In torque transmitting apparatus: driving and driven members; coengageable clutch elements on said members effecting a rotatable driving connection between said members, said elements comprising cam means responsive to the torque transmitted through said members and tending to shift said elements axially from each other; fluid pressure actuated means movable axially with one of said members, said fluid pressure actuated means having a high pressure side and a low pressure side; means for feeding fluid under pressure against said high pressure side to hold said fluid pressure actuated means engaged with the other of said members and said elements in driving engagement with each other; said other of said members having a passage establishing communication between said low pressure side and the surrounding atmosphere; coengaging means on said fluid pressure actuated means and said other of said members initially closing said passage and preventing said fluid under pressure from acting on said low pressure side; axial movement of said fluid pressure actuated means and said one of said members away from said other of said members in response to the torque transmitted through said elements exceeding a predetermined value opening said passage and placing said fluid pressure actuated means in position for said fluid under pressure to act simultaneously on both said high pressure and low pressure sides; said passage having an orifice therein for greatly restricting flow of fluid through said passage.

16. In torque transmitting apparatus: driving and driven members; coengageable clutch elements on said members effecting a rotatable driving connection between said members, said elements comprising cam means responsive to the torque transmitted through said members and tending to shift said elements axially from each other; fluid actuated means movable axially with said driven member, said fluid pressure actuated means having a high pressure side and a low pressure side; means for feeding fluid under pressure against said high pressure side to hold said fluid pressure actuated means engaged with said driving member and said elements in driving engagement with each other; said driving member having a passage establishing communication between said low pressure side and the surrounding atmosphere; coengaging means on said fluid pressure actuated means and said driving member initially closing said passage and preventing said fluid under pressure from acting on said low pressure side; axial movement of said fluid pressure actuated means and said driven member away from said driving member in response to the torque transmitted through said elements exceeding a predetermined value opening said passage and placing said fluid pressure actuated means in position for said fluid under pressure to act simultaneously on both said high pressure and low pressure sides; said passage having an orifice therein for greatly restricting flow of fluid through said passage.

17. In torque transmitting apparatus: driving and driven members; coengageable elements on said members effecting a rotatable driving connection between said members, a first valve member rotatable with one of said members and having a fluid passage; and a second valve member rotatable with the other of said members and subject to fluid under pressure to close said passage and maintain said elements in driving relation with respect to each other; said fluid passage being communicable with the low pressure side of said second valve member and being open to communication with the high pressure side of said second valve member in response to movement of said second valve member relative to said first valve member.

18. In torque transmitting apparatus: a casing; driving and driven members in said casing; coengageable elements on said members effecting a rotatable driving connection between said members; a first valve member rotatable with one of said members and having a passage establishing communication between the interior and exterior of said casing; a second valve member rotatable with the other of said members and subjected to fluid under pressure within said casing to close said passage and maintain said elements in driving relation with respect to each other; means for introducing fluid under pressure into said casing; and means for varying the pressure of such fluid.

19. In torque transmitting apparatus: a casing; driving and driven members in said casing; coengageable clutch elements on said members effecting a rotatable driving connection between said members, said elements comprising cam means responsive to the torque transmitted through said members to disengage said elements from each other; a first valve member rotatable with one of said members and having a passage establishing communication between the interior and exterior of said casing; and a second valve member rotatable with the other of said members and subject to fluid under pressure within said casing to close said passage and hold said elements in engagement in opposition to the disengaging force exerted between said elements while transmitting torque.

20. In torque transmitting apparatus: a casing; driving and driven members in said casing; coengageable clutch elements on said members effecting a rotatable driving connection between said members, said elements comprising cam means responsive to the torque transmitted through said members to disengage said elements from each other; a valve body rotatable with said driving member and having a passage establishing communication between the interior and exterior of said casing; and a valve head rotatable with said driven member and subject to fluid under pressure within said casing to close said passage and hold said elements in engagement in opposition to the disengaging force exerted between said elements while transmitting torque.

References Cited in the file of this patent

UNITED STATES PATENTS

| | | |
|---|---|---|
| 2,642,971 | Hagenbook | June 23, 1953 |
| 2,683,512 | Boice | July 13, 1954 |